United States Patent
Kafantaris et al.

(10) Patent No.: US 11,060,667 B2
(45) Date of Patent: Jul. 13, 2021

(54) RAPID GAS RELEASE SYSTEM

(71) Applicant: Hyperion Motors, Inc., Orange, CA (US)

(72) Inventors: Constantine E. Kafantaris, Orange, CA (US); Daniel J. Ovalles, Orange, CA (US)

(*) Notice: Subject to any disclaimer, the term of this patent is extended or adjusted under 35 U.S.C. 154(b) by 32 days.

(21) Appl. No.: 16/504,268

(22) Filed: Jul. 6, 2019

(65) Prior Publication Data

US 2021/0003254 A1 Jan. 7, 2021

(51) Int. Cl.
*F17C 5/06* (2006.01)
*F17C 5/00* (2006.01)

(52) U.S. Cl.
CPC ............... *F17C 5/06* (2013.01); *F17C 5/007* (2013.01); *F17C 2221/012* (2013.01); *F17C 2223/0123* (2013.01)

(58) Field of Classification Search
CPC .... F17C 5/06; F17C 5/007; F17C 2223/0123; F17C 2221/033; F23C 5/00; F23C 10/16; F16K 17/00; F16K 17/003
USPC ............................................. 137/72; 431/202
See application file for complete search history.

(56) References Cited

U.S. PATENT DOCUMENTS

| | | | | |
|---|---|---|---|---|
| 5,031,588 A * | 7/1991 | Artman | .................... | F02B 17/00 123/262 |
| 5,177,952 A * | 1/1993 | Stone | .................... | F01K 25/005 60/39.12 |
| 5,364,262 A * | 11/1994 | Phillips | .................... | F23G 7/08 431/18 |
| 5,542,606 A * | 8/1996 | Kadyrov | ............... | B05B 7/0006 239/81 |
| 6,155,212 A * | 12/2000 | McAlister | ............... | F02B 43/10 123/3 |
| 2008/0263954 A1* | 10/2008 | Hammel | ................ | B01J 23/755 48/127.9 |
| 2009/0263755 A1* | 10/2009 | Nigro | ...................... | F23D 14/68 431/202 |
| 2009/0266823 A1* | 10/2009 | Mazabraud | ........... | B29C 41/003 220/581 |
| 2012/0160221 A1* | 6/2012 | Munshi | .............. | F02M 21/0206 123/575 |
| 2015/0167972 A1* | 6/2015 | Zhdaneev | ............... | F23N 5/242 431/5 |
| 2015/0337769 A1* | 11/2015 | Yoshioka | .............. | F02D 19/022 137/512 |
| 2016/0216715 A1* | 7/2016 | Lapena-Rey | ........ | G05D 16/106 |
| 2016/0281873 A1* | 9/2016 | Yoshioka | .............. | F16K 17/168 |

* cited by examiner

*Primary Examiner* — Timothy L Maust
(74) *Attorney, Agent, or Firm* — Kafantaris Law Offices; Theo Kafantaris

(57) ABSTRACT

The present invention provides a rapid gas release system for rapidly regulating and burning compressed, combustible gas as a safety precaution to prevent explosion, while also exhausting any heat produced by the burning. This is accomplished through a combustor, a regulator in fluid connection with the combustor and a tank, a controller, and a cooling chamber. The tank contains the compressed combustible gas, which is released into the combustion chamber and burned, then exhausted to the cooling chamber.

17 Claims, 6 Drawing Sheets

RAPID GAS RELEASE SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to a system and apparatus for rapidly releasing compressed gas, and more particularly, to a system and apparatus for the controlled burn of compressed hydrogen gas as a safety precaution to prevent explosion.

DISCUSSION OF RELATED ART

Hydrogen is a colorless, odorless and combustible gas, the lightest and most abundant substance in the universe. Hydrogen readily forms with most non-metallic elements such as oxygen, carbon, and nitrogen. In fact, most of the hydrogen on our planet is bound to oxygen in the form water ($H_2O$), which is our most abundant compound.

The uses of hydrogen are plentiful, ranging from fertilizer to hydrocracking to fuel cells and more. When not bound to other elements, hydrogen is traditionally stored as a compressed gas ($H_2$) at pressures up to and exceeding 10,000 PSI. Storing hydrogen at such high pressures requires specialized tanks that are built to withstand incredible force, both inward and outward, but also present unique risks.

Any concentration of combustible gas presents a risk of explosion or fire. This is particularly critical in the case of hydrogen because it ignites at a mere 4% concentration of air. Furthermore, hydrogen burns with an invisible flame at incredible temperatures. Moreover, hydrogen has a fast flame front, which allows it to engulf other flammable materials quickly and across a vast space. As such, whenever working with compressed hydrogen, it is very important to plan for emergency situations.

While working with compressed gas presents many unique challenges, systems exist that help mitigate the risk of an explosion or fire. Most commonly, systems that utilize compressed hydrogen often implement a ventilation system as a safety precaution, where hydrogen gas is ventilated to the environment in the case of an emergency. While these implementations do have merit, there are a plurality of environments where this type of ventilation is not adequate, or even impossible. Furthermore, ventilation systems may actually cause more harm than good, as the ventilation of hydrogen gas in a closed environment may very well cause an explosion or fire where there would be none otherwise.

While safety systems exist in the prior art for mitigating the risk of working with compressed combustible gases, namely ventilation systems adapted to release the gas to the environment in an emergency, there is a continued need for a system adapted to rapidly regulate and burn compressed, combustible gas as a safety precaution to prevent explosion while also exhausting any heat produced by said burning. The present invention satisfies these needs.

SUMMARY OF THE INVENTION

The present invention will provide a system configured to rapidly regulate and burn compressed, combustible gas as a safety precaution to prevent explosion while also exhausting any heat produced by said burning. This is accomplished through a combustor, a regulator in fluid connection with the combustor and a tank, a controller, and a cooling chamber. The tank contains the compressed combustible gas, which is released into the cooling chamber and burned, then exhausted to the cooling chamber.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Figure 1:
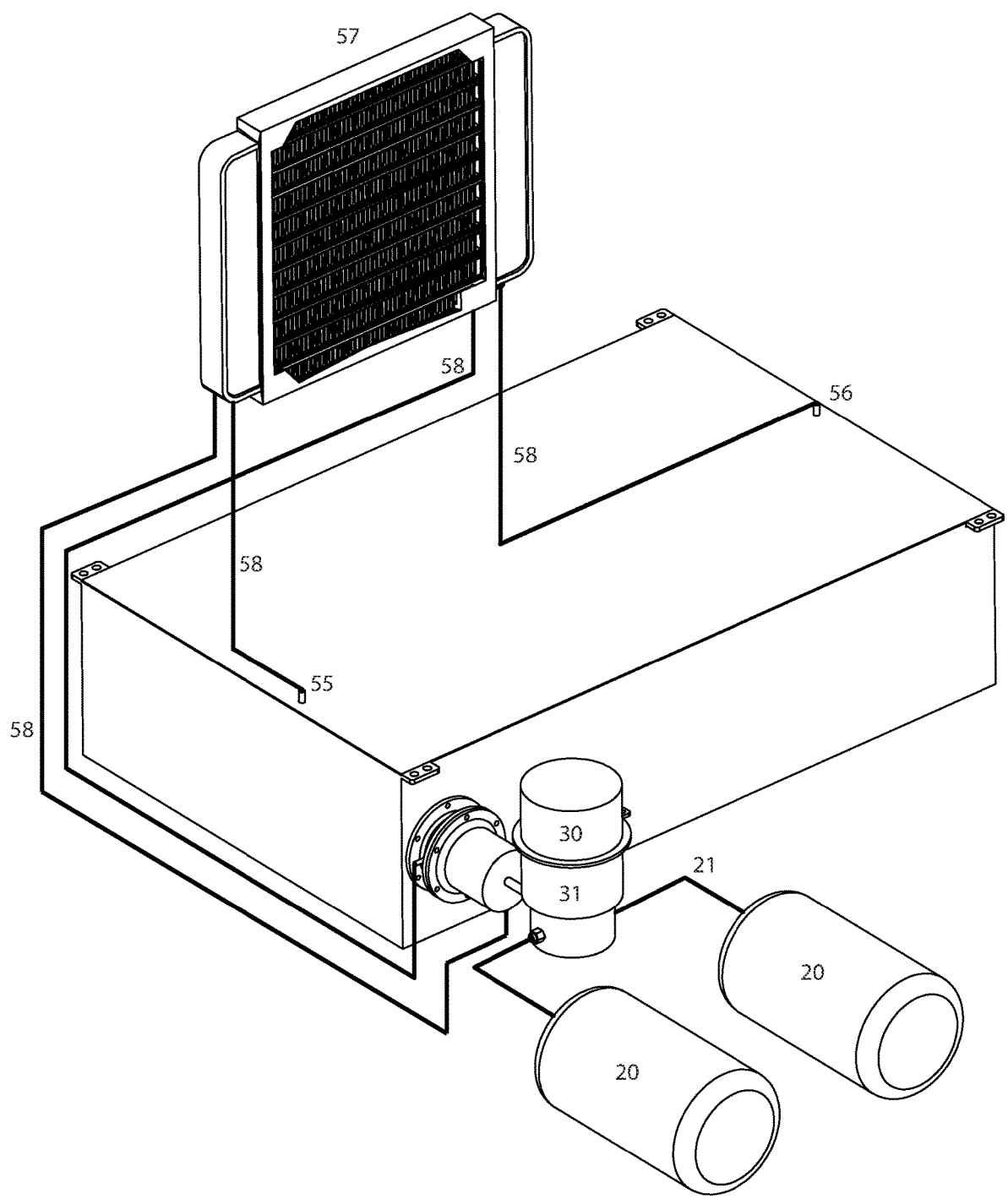
FIG. 1 is a front perspective view of the rapid gas release system according to one embodiment of the present invention.
Figure 2A:
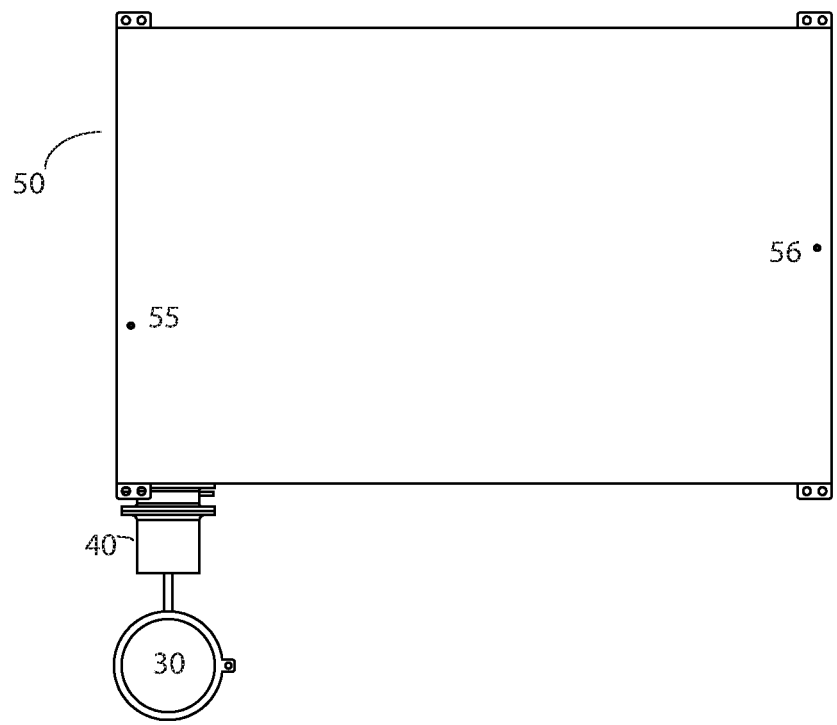
FIG. 2A is a top view therein without tanks and radiator.
Figure 2B:
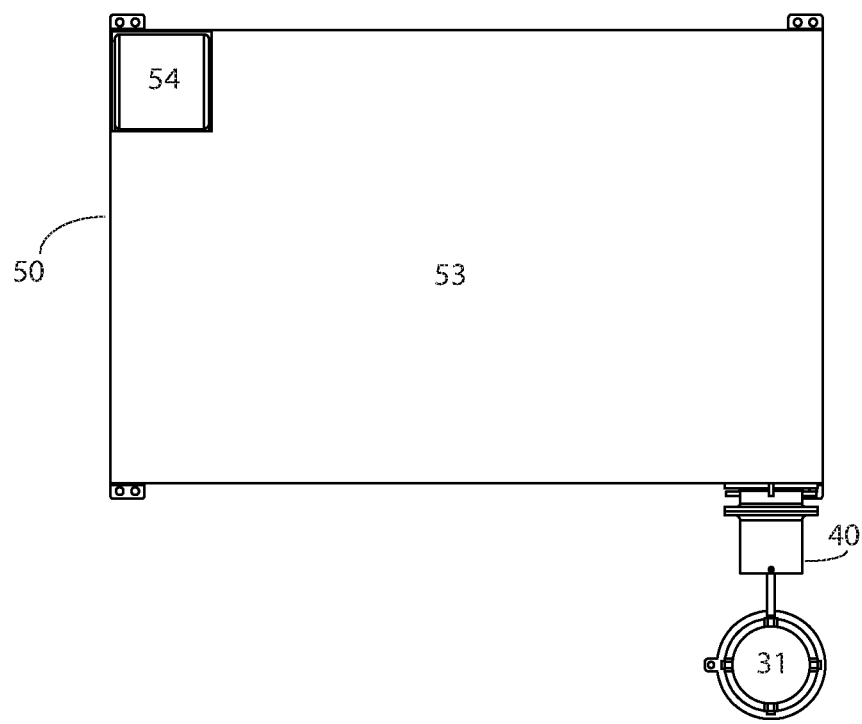
FIG. 2B is a bottom view therein.
Figure 3A:
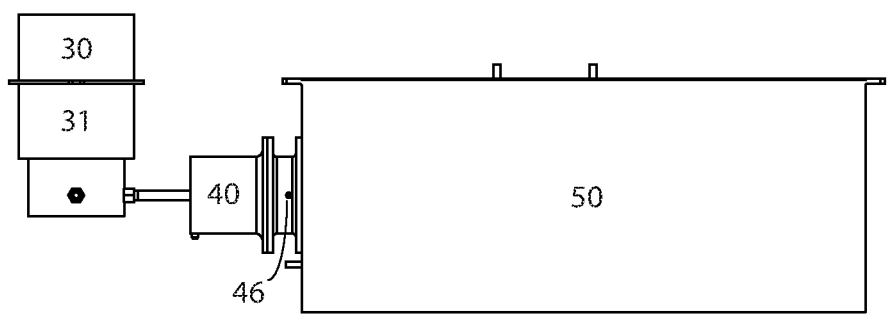
FIG. 3A is a front view therein.
Figure 3B:
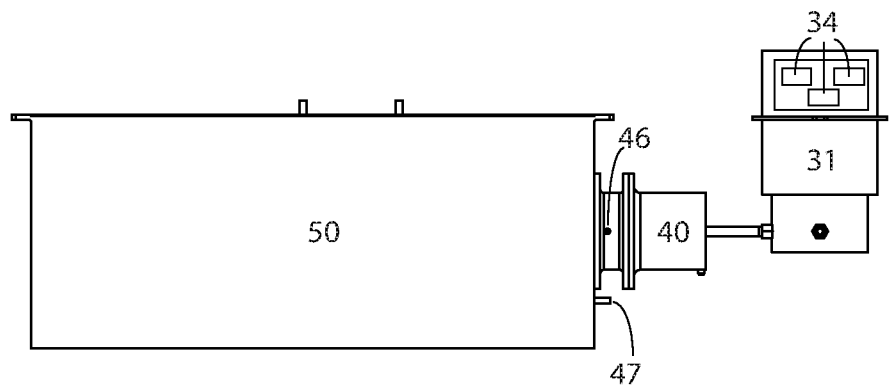
FIG. 3B is a rear view therein.
Figure 4:
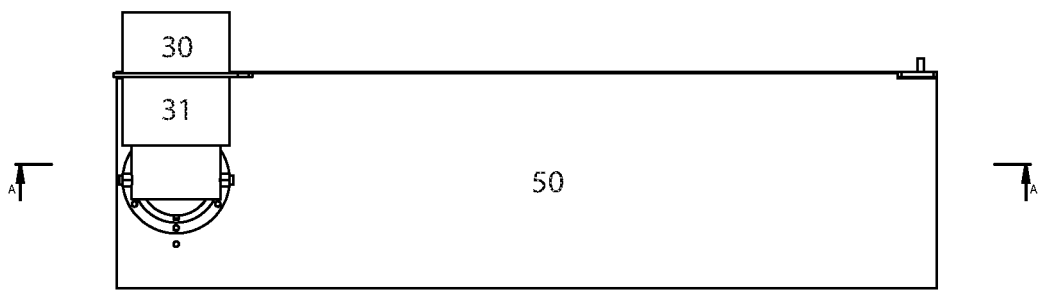
FIG. 4 is a side view therein.
Figure 5:
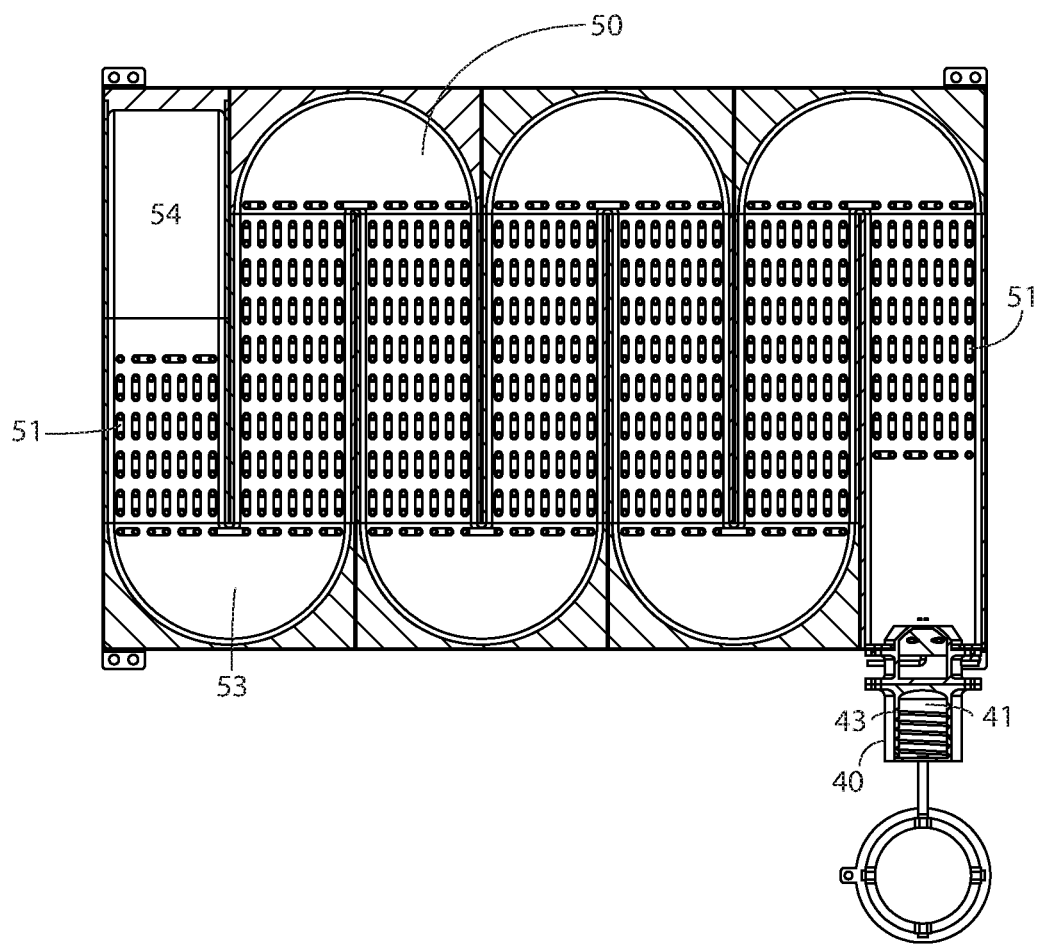
FIG. 5 is a top cross-sectional view therein taken along line A-A of FIG. 4.
Figure 6A:
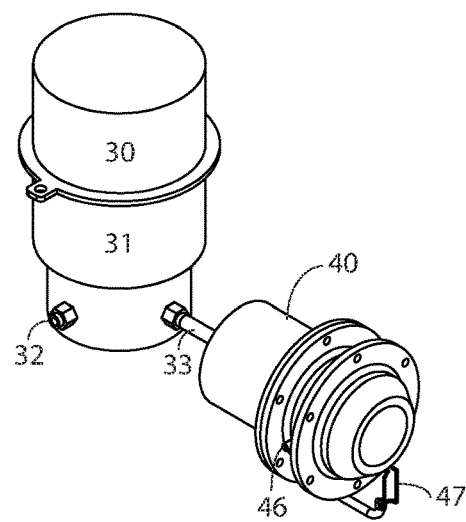
FIG. 6A is a front perspective view of the controller, regulator, and combustor according to one embodiment of the present invention.
Figure 6B:
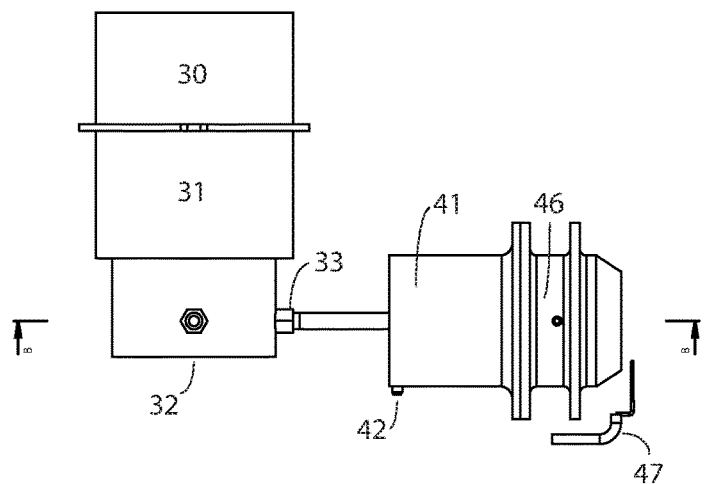
FIG. 6B is a side view therein.
Figure 6C:
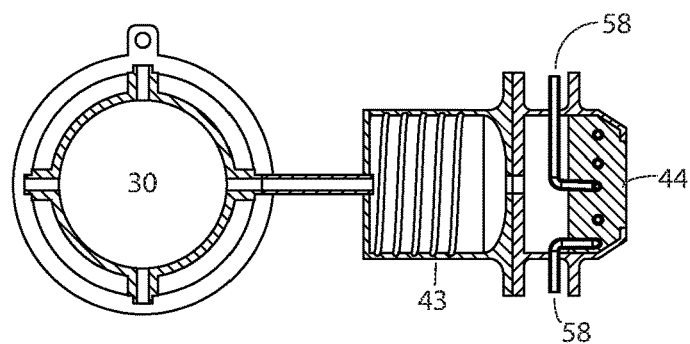
FIG. 6C is a top cross-sectional view therein taken along line B-B of FIG. 6B.
Figure 7:
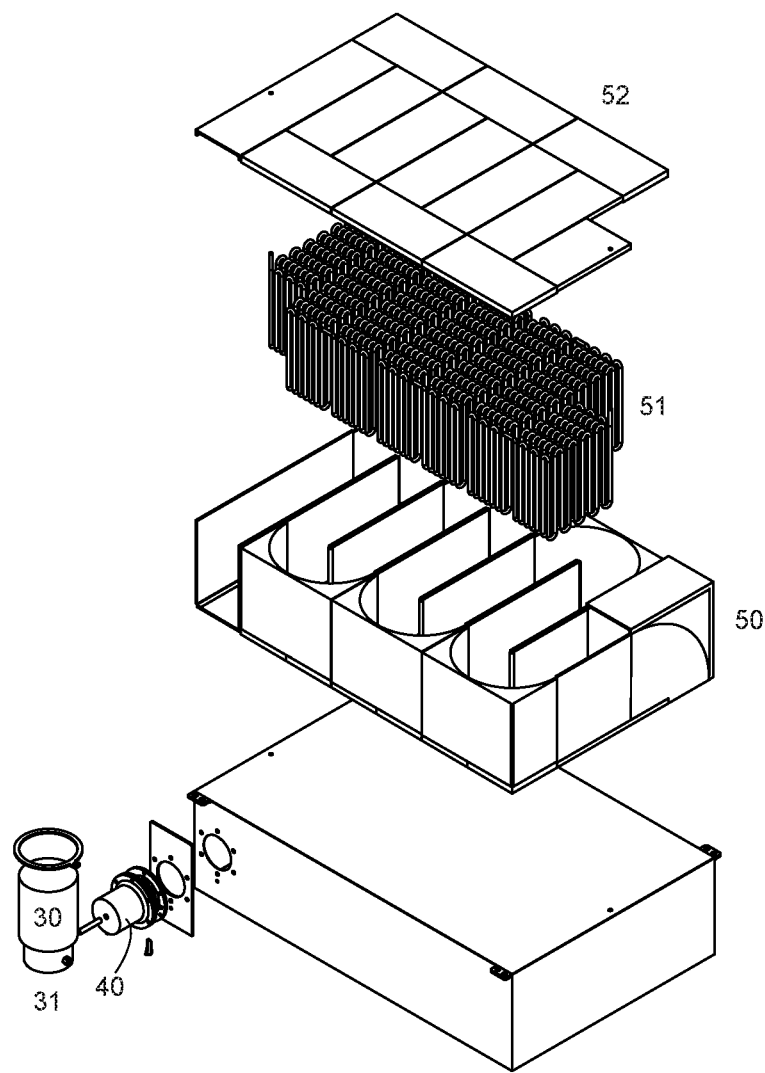
FIG. 7 is an exploded perspective view of the rapid gas release system according to one embodiment of the present invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The rapid gas release system comprises a tank 20, a controller 30, a combustor 40, and a cooling chamber 50. The tank 20 is in fluid connection with the combustor 40, where compressed gas held within the tank 20 is burned in the combustor 40 and exhausted to the cooling chamber 50. The controller 30 will activate the system and regulate the pressure to a workable level. As a whole, these components work in conjunction to rapidly release and burn combustible gas as a safety precaution to prevent explosion.

In the preferred embodiment, the combustor 40 is in fluid connection with one or a plurality of tanks 20 through a plurality of tank lines 21, each tank 20 filled with compressed combustible gas at a holding pressure. Each tank 20 is made from a composite material such as carbon fiber, adapted to withstand immense pressure, and a may further comprise a thermoplastic liner configured to retain the compressed gas up to 10,000 PSI. As such, the holding pressure ranges between 100-10,000 PSI. In the preferred embodiment, the compressed combustible gas is compressed hydrogen gas, although any compressed combustible gas can be used.

A controller 30 is configured to receive a signal and activate the system, enabling the compressed combustible gas to flow from the tanks 20 through the regulator 31 to the combustor 40 and activating an ignition mechanism 47, thereby activating the system and burning the compressed combustible gas in the tanks 20. In the preferred embodiment, a plurality of sensors 34 are in electrical communication with the controller 30. The plurality of sensors 34 further comprise temperature sensors, pressure sensors, collision sensors, fault sensors, directional sensors, and any other sensors which can be used to determine an emergency state. These sensors 34 may work alone or in conjunction to provide information to the controller 30 to automatically activate the system.

More specifically, the plurality of sensors 34 will send sensor data to the controller 30, where the sensor data is used to determine whether to automatically activate the system. For example, if temperature sensors report back values beyond threshold amounts along with fault sensors reporting a catastrophic fault, then the system will activate and burn the compressed combustible gas in a controlled manner as a safety precaution to prevent explosion. In an alternative embodiment, the signal may be manually received, such as an emergency override button manually activating the system in the event of an emergency.

A regulator 31 is positioned between the tanks 20 and the combustor 40 and in fluid connection with both. More specifically, the regulator 31 comprises a plurality of compressed gas intake ports 32 in fluid connection with the tanks 20 through a plurality of tank lines 21. The regulator 31 is configured to regulate the pressure of the compressed combustible gas from the holding pressure to a combustion pressure and to output the regulated compressed gas to the combustor 40 through an output port 33. In the preferred embodiment, the combustion pressure ranges between 500-7,500 PSI.

The regulator 31 is a normally closed valve, where the regulator 31 must be activated to open and will remain closed unless activated as a safety precaution. Furthermore, the compressed gas intake ports 42 are one-way ports, where compressed gas can enter the regulator 31 but cannot leave. These safety precautions will prevent flashback explosions from the combustor 30 back to the tank 20.

The combustor 40 is configured to receive and burn the compressed combustible gas. The combustor 40 comprises an intake chamber 41, a nozzle 48, and an ignition mechanism 47. The intake chamber 41 is configured to receive compressed combustible gas from the regulator 31, which has been regulated to a combustion pressure, and to mix it with oxygen to create a combustible mixture having desirable air/fuel ratio for combustion. In the preferred embodiment where the compressed gas is hydrogen gas, the air/fuel ratio is 25% oxygen and 75% hydrogen gas.

The intake chamber 41 is configured to receive compressed or uncompressed oxygen through an oxygen intake port 42 in fluid connection with an oxygen tank or ambient air. The oxygen intake port 42 is a one-way port, where oxygen can enter the intake chamber 41 but cannot leave. In an alternative embodiment, the intake chamber 41 further comprises a plurality of grooves 43 configured to advance the mixing of the compressed combustible gas and the oxygen into a combustible mixture. More specifically, regulated compressed gas will travel at a high rate through the output port 33 and into the intake chamber 41, causing the intake chamber 41 to have a flow direction towards the nozzle 48. As such, the grooves 43 will cause the flow of compressed gas and oxygen to rotate and swirl, encouraging them to mix into a combustible mixture more efficiently.

The nozzle 48 and ignition mechanism 47 are positioned adjacent to the intake chamber 41 and are configured to receive the combustible mixture and burn it. The nozzle 48 is adapted to direct the flow of oxygen inward toward the cooling chamber 50 in a horizontal direction in order to more efficiently direct the exhaust through the cooling chamber 50. The nozzle 48 further comprises a porous material 44 configured to release the combustible mixture unidirectionally from the intake chamber 41 to the ignition mechanism 47. The porous material 44 is configured to withstand immense pressure and temperature and primarily is configured to prevent flashback, where the combustible mixture is burned or combusted earlier than intended within the intake chamber 41 or regulator 31. In an alternative embodiment, the porous material 44 comprises one or a plurality of cooling lines 58 in fluid connection with a radiator 57 and configured to receive coolant and cool the porous material 44 during combustion by radiating heat outside of the combustor 40 through the radiator 57. The cooling of the porous material 44 is critical, as high temperatures and pressures will slow the flow of the combustible mixture through the porous material 44 and out through the nozzle 48.

The ignition mechanism 47 will ignite the combustible mixture, thereby combusting and exhausting the combustible gas into the cooling chamber 50. In the preferred embodiment, the ignition mechanism 47 is a sparking mechanism, where the sparking mechanism continuously sparks for the duration of the release and combustion of the compressed combustible gas to prevent blowaway. Blowaway occurs when the combustible mixture travels with such velocity that combustion ceases. In an alternative embodiment, the ignition mechanism 47 is a pilot flame, where the combustible gas is a fuel source for the pilot flame.

The cooling chamber 50 is configured to receive the combusted compressed gas from the combustor 40 and dissipate the resultant heat. The cooling chamber 50 further comprises a serpentine cooling line 51 and a radiator 57. In the preferred embodiment, the cooling chamber 50 is shaped as a serpentine channel. The serpentine cooling line 51 is positioned within the cooling chamber 50 and is configured to circulate coolant into and out of the cooling chamber 50 to the radiator 57. The radiator 57 is in fluid connection with the serpentine cooling line 51 and configured to receive the coolant and radiate heat from the coolant outside of the cooling chamber 50.

When in use, exhaust will enter the cooling chamber 50 through the combustion of the compressed gas, said exhaust having a high temperature that must be reduced. The heat from the exhaust will transfer into the coolant through the serpentine cooling line 51, increasing the temperature of the coolant. The coolant will flow out of the system will flow into the radiator 57, which will dissipate the heat in the coolant and reduce its temperature, thereby removing heat from the system. The coolant will then flow through another coolant line 58 into a coolant intake port 55, where it will again receive heat from the cooling chamber 50. This process continues until the temperature of the system is reduced below a threshold value. The rate of cooling is dictated by the flow rate of the coolant and the rate through which the radiator can radiate heat from the coolant. In an alternative embodiment, a pump is used to circulate the coolant through the radiator 57, cooling lines 58, serpentine cooling lines 51, and porous material 44.

The cooling chamber 50 further comprises a heat enclosure configured to encapsulate the cooling chamber such that heat is retained within the enclosure. In the preferred embodiment, this heat enclosure is made from silica, which will reflect heat back into the cooling chamber 50 and force heat to be removed through the coolant exiting the system.

In the preferred embodiment, where the compressed gas is hydrogen gas, the byproduct after being combusted, exhausted, cooled is water. As such, an exhaust port 54 is positioned opposite the combustor 40. Here, the exhaust port 54 is configured to release the exhaust and water out of the cooling chamber 50, where the exhaust is cooled prior to being released from said exhaust port. The bottom panel of the combustion chamber 50 is configured with a slight decline to encourage the water to flow from said combustor 40 to said exhaust port 54.

In the preferred embodiment, combustion is initiated from the controller 30 comprising a plurality of sensors 34, where the sensors 34 instruct the controller 30 to activate the regulator 31. The regulator 31 will reduce the compressed combustible gas to a combustion pressure, where the combustor 40 mixes the combustible gas with oxygen into a combustible mixture. The combustible mixture will pass through the porous material 44 and nozzle 48, where the ignition mechanism 47 ignites the combustible mixture, releasing exhaust and water directed horizontally into the cooling chamber 50. Here, the combustible mixture is combusted at the combustion pressure so long as the plurality of sensors 34 do not exceed threshold values.

While the above description contains specific details regarding certain elements, sizes, and other teachings, it is understood that embodiments of the invention or any combination of them may be practiced without these specific details. Specifically, although certain shapes are described and shown in the above embodiments and drawings, any suitable shape may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A rapid gas release system comprising:
   a tank, said tank filled with compressed combustible gas at a holding pressure;
   a combustor in fluid connection with said tank and configured to receive and combust said compressed combustible gas;
   a regulator positioned between said tank and said combustor and in fluid connection with both, said regulator configured to regulate the pressure of said compressed combustible gas from a holding pressure to a combustion pressure; and
   a cooling chamber in fluid connection with said combustor and configured to receive and cool exhaust from said combustor, said cooling chamber further comprising a serpentine cooling line positioned within said cooling chamber, said serpentine cooling line having a serpentine shape and configured to circulate coolant into and out of said cooling chamber;
   wherein said rapid gas release system releases and combusts high pressure combustible gas in the event of an emergency.

2. The system of claim 1, further comprising a controller configured to activate said regulator, enabling said compressed combustible gas to flow from said tank through said regulator to said combustor when a signal is received.

3. The system of claim 2, wherein said signal is manually input.

4. The system of claim 2, wherein said controller further comprises a plurality of sensors in electrical communication with said controller, said plurality of sensors further comprising temperature sensors, pressure sensors, fault sensors, collision sensors, and directional sensors, wherein said signals detect whether to automatically activate said regulator.

5. The system of claim 1, wherein said combustor further comprises an intake chamber, said intake chamber further comprising an oxygen intake port configured to receive oxygen, wherein said compressed combustible gas mixes with said oxygen and forms a combustible mixture.

6. The system of claim 5, wherein said intake chamber further comprises a plurality of grooves configured to advance the mixing of said compressed combustible gas and said oxygen into said combustible mixture.

7. The system of claim 5, wherein said combustor further comprises a nozzle and an ignition mechanism, said nozzle comprising a porous material configured to release said combustible mixture unidirectionally from said intake chamber toward said ignition mechanism, wherein said porous material prevents flashback.

8. The system of claim 7, wherein said ignition mechanism further comprises a sparking mechanism, wherein said sparking mechanism continuously sparks for the duration of the release and combustion of said compressed combustible gas to prevent blowaway.

9. The system of claim 1, further comprising a radiator in fluid connection with said serpentine cooling line and configured to receive said coolant and radiate heat from said coolant outside of said cooling chamber in a closed loop.

10. The system of claim 1, wherein said cooling chamber further comprises a heat enclosure configured to encapsulate said cooling chamber such that heat is retained within said enclosure, said heat enclosure further comprising silica.

11. The system of claim 1, wherein said cooling chamber further comprises a serpentine channel, and wherein said serpentine cooling line is positioned along said serpentine channel.

12. The system of claim 1, wherein said cooling chamber further comprises an exhaust port positioned opposite said combustor, wherein said combustor is configured to release exhaust and water, and wherein said exhaust port is configured to release said exhaust and water out of said cooling chamber, wherein said exhaust is cooled prior to being released from said exhaust port.

13. The system of claim 12, wherein said cooling chamber further comprises a slight decline, said decline configured to encourage said water to flow from said combustor to said exhaust port.

14. The device of claim 1, wherein the tank further comprises a composite material and a thermoplastic liner configured to retain compressed gas up to 10,000 PSI.

15. The system of claim 1, wherein said combustion is initiated from a controller, said controller further comprising a plurality of sensors, wherein said regulator will reduce said compressed combustible gas to a combustion pressure, wherein said combustor mixes said combustible gas with oxygen into a combustible mixture, wherein said ignition mechanism ignites said combustible mixture releasing exhaust and water into said cooling chamber, wherein said combustible mixture is combusted at said combustion pressure so long as said plurality of sensors do not exceed threshold values.

16. The system of claim 1, wherein said compressed combustible gas is compressed hydrogen gas.

17. The system of claim 1, wherein said holding pressure is 10,000 PSI and wherein said combustion pressure ranges between 500 PSI and 7,500 PSI.

* * * * *